US012592054B2

(12) United States Patent
Ren et al.

(10) Patent No.: US 12,592,054 B2
(45) Date of Patent: Mar. 31, 2026

(54) LOW-LIGHT VIDEO PROCESSING METHOD, DEVICE AND STORAGE MEDIUM

(71) Applicant: SANECHIPS TECHNOLOGY CO., LTD., Shenzhen (CN)

(72) Inventors: Cong Ren, Shenzhen (CN); Ke Xu, Shenzhen (CN); Dehui Kong, Shenzhen (CN); Jing You, Shenzhen (CN); Xin Liu, Shenzhen (CN); Fang Zhu, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 579 days.

(21) Appl. No.: 17/999,467

(22) PCT Filed: Jun. 9, 2021

(86) PCT No.: PCT/CN2021/099155
§ 371 (c)(1),
(2) Date: Nov. 21, 2022

(87) PCT Pub. No.: WO2021/254229
PCT Pub. Date: Dec. 23, 2021

(65) Prior Publication Data
US 2023/0196721 A1      Jun. 22, 2023

(30) Foreign Application Priority Data
Jun. 18, 2020    (CN) ........................ 202010561289.X

(51) Int. Cl.
*G06V 10/60* (2022.01)
*G06T 3/18* (2024.01)
(Continued)

(52) U.S. Cl.
CPC ................ *G06V 10/60* (2022.01); *G06T 3/18* (2024.01); *G06T 3/40* (2013.01); *G06V 10/24* (2022.01); *H04N 9/64* (2013.01); *H04N 19/513* (2014.11)

(58) Field of Classification Search
CPC ...... G06V 10/60; G06V 10/24; G06V 10/774; G06V 20/46; G06T 3/18; G06T 3/40;
(Continued)

(56) References Cited

U.S. PATENT DOCUMENTS

2004/0001705 A1    1/2004   Soupliotis et al.
2015/0228061 A1    8/2015   Shin et al.
(Continued)

FOREIGN PATENT DOCUMENTS

CN        104700364 A     6/2015
CN        104756152 A     7/2015
(Continued)

OTHER PUBLICATIONS

CN-111047532-A—English Translation (Year: 2020).*
(Continued)

*Primary Examiner* — Gandhi Thirugnanam
*Assistant Examiner* — Aaron Joseph Sorrin
(74) *Attorney, Agent, or Firm* — Vivacqua Crane, PLLC

(57)    ABSTRACT

A low-illuminance video processing method, a low-illuminance video processing device and a storage medium are disclosed. The method includes: acquiring a same number of preceding frame images and subsequent frame images corresponding to a current video frame of a low-illuminance video to obtain a frame image set corresponding to the current video frame, and performing traversal on the low-illuminance video to obtain frame image sets corresponding to all video frames; after performing image alignment on all frame images in the frame image sets corresponding to all
(Continued)

Acquire a same number of preceding frame images and subsequent frame images corresponding to a current video frame of a low-illuminance video to obtain a frame image set corresponding to the current video frame, and perform traversal on the low-illuminance video to obtain frame image sets corresponding to all video frames    — S110

After image alignment is performed on all frame images in the frame image sets corresponding to all video frames, input the frame image sets into a pre-trained low-illuminance image enhancement model to obtain enhanced frame images    — S120

Generate an enhanced video based on the enhanced frame images    — S130 video frames, inputting the frame image sets into a pre-trained low-illuminance image enhancement model to obtain enhanced frame images; and generating an enhanced video based on the enhanced frame images.

14 Claims, 5 Drawing Sheets

(51) Int. Cl.

| | |
|---|---|
| *G06T 3/40* | (2024.01) |
| *G06V 10/24* | (2022.01) |
| *H04N 9/64* | (2023.01) |
| *H04N 19/513* | (2014.01) |

(58) Field of Classification Search

CPC ... G06T 5/60; G06T 5/90; G06T 2207/10016; G06T 2207/20081; G06T 2207/20084; G06T 5/50; G06T 7/30; G06T 3/14; G06T 5/00; G06T 2207/20201; H04N 9/64; H04N 19/513; H04N 9/646; H04N 19/139

See application file for complete search history.

(56) References Cited

U.S. PATENT DOCUMENTS

| | | | |
|---|---|---|---|
| 2017/0214937 A1* | 7/2017 | Lin | H04N 19/577 |
| 2018/0007382 A1* | 1/2018 | Pio | H04N 19/172 |

FOREIGN PATENT DOCUMENTS

| | | | | | |
|---|---|---|---|---|---|
| CN | 107403413 A | * | 11/2017 | ............... | G06T 5/70 |
| CN | 110163818 A | | 8/2019 | | |
| CN | 110675336 A | | 1/2020 | | |
| CN | 110969584 A | | 4/2020 | | |
| CN | 111047532 A | * | 4/2020 | | |
| CN | 111225278 A | | 6/2020 | | |

OTHER PUBLICATIONS

CN-107403413-A—English Translation (Year: 2017).*
Wei, Chen, et al. "Deep retinex decomposition for low-light enhancement." arXiv preprint arXiv:1808.04560 (2018). (Year: 2018).*
The State Intellectual Property Office of People's Republic of China. First Office Action for CN Application No. 202010561289.X and English translation, mailed Dec. 31, 2024, pp. 1-17.
The State Intellectual Property Office of People's Republic of China. First Search Report for CN Application No. 202010561289.X and English translation, mailed Dec. 27, 2024, pp. 1-6.
International Searching Authority. International Search Report and Written Opinion for PCT Application No. PCT/CN2021/099155 and English translation, mailed Aug. 31, 2021, pp. 1-11.
Wang, et al. "Multi-level decomposition Retinex low-light image enhancement algorithm" and English translation, Application Research of Computers, vol. 37, No. 4, Apr. 2020, pp. 1204-1209.

* cited by examiner

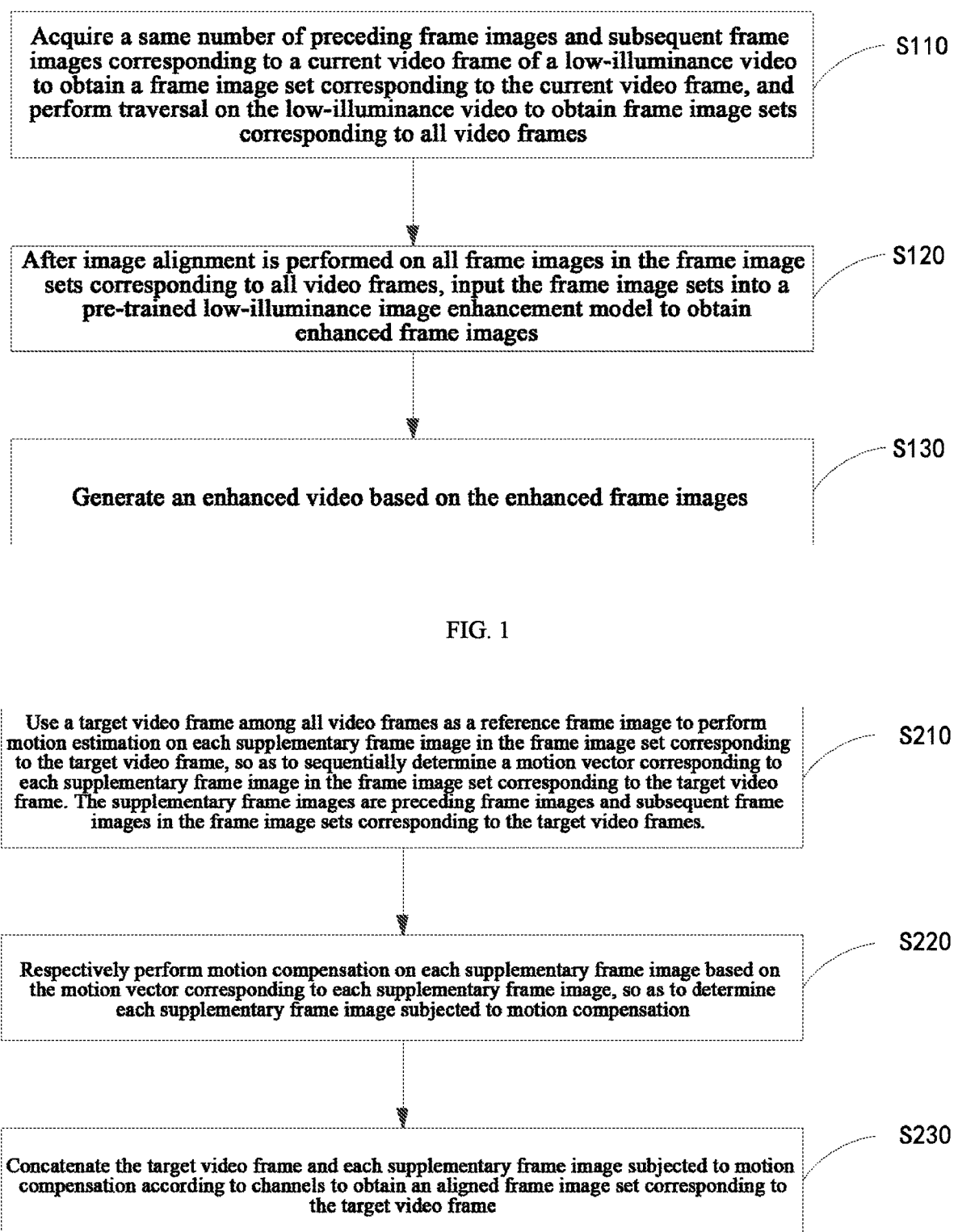

Acquire a same number of preceding frame images and subsequent frame images corresponding to a current video frame of a low-illuminance video to obtain a frame image set corresponding to the current video frame, and perform traversal on the low-illuminance video to obtain frame image sets corresponding to all video frames

S110

After image alignment is performed on all frame images in the frame image sets corresponding to all video frames, input the frame image sets into a pre-trained low-illuminance image enhancement model to obtain enhanced frame images

S120

Generate an enhanced video based on the enhanced frame images

Use a target video frame among all video frames as a reference frame image to perform motion estimation on each supplementary frame image in the frame image set corresponding to the target video frame, so as to sequentially determine a motion vector corresponding to each supplementary frame image in the frame image set corresponding to the target video frame. The supplementary frame images are preceding frame images and subsequent frame images in the frame image sets corresponding to the target video frames.

S210

Respectively perform motion compensation on each supplementary frame image based on the motion vector corresponding to each supplementary frame image, so as to determine each supplementary frame image subjected to motion compensation

S220

Concatenate the target video frame and each supplementary frame image subjected to motion compensation according to channels to obtain an aligned frame image set corresponding to the target video frame

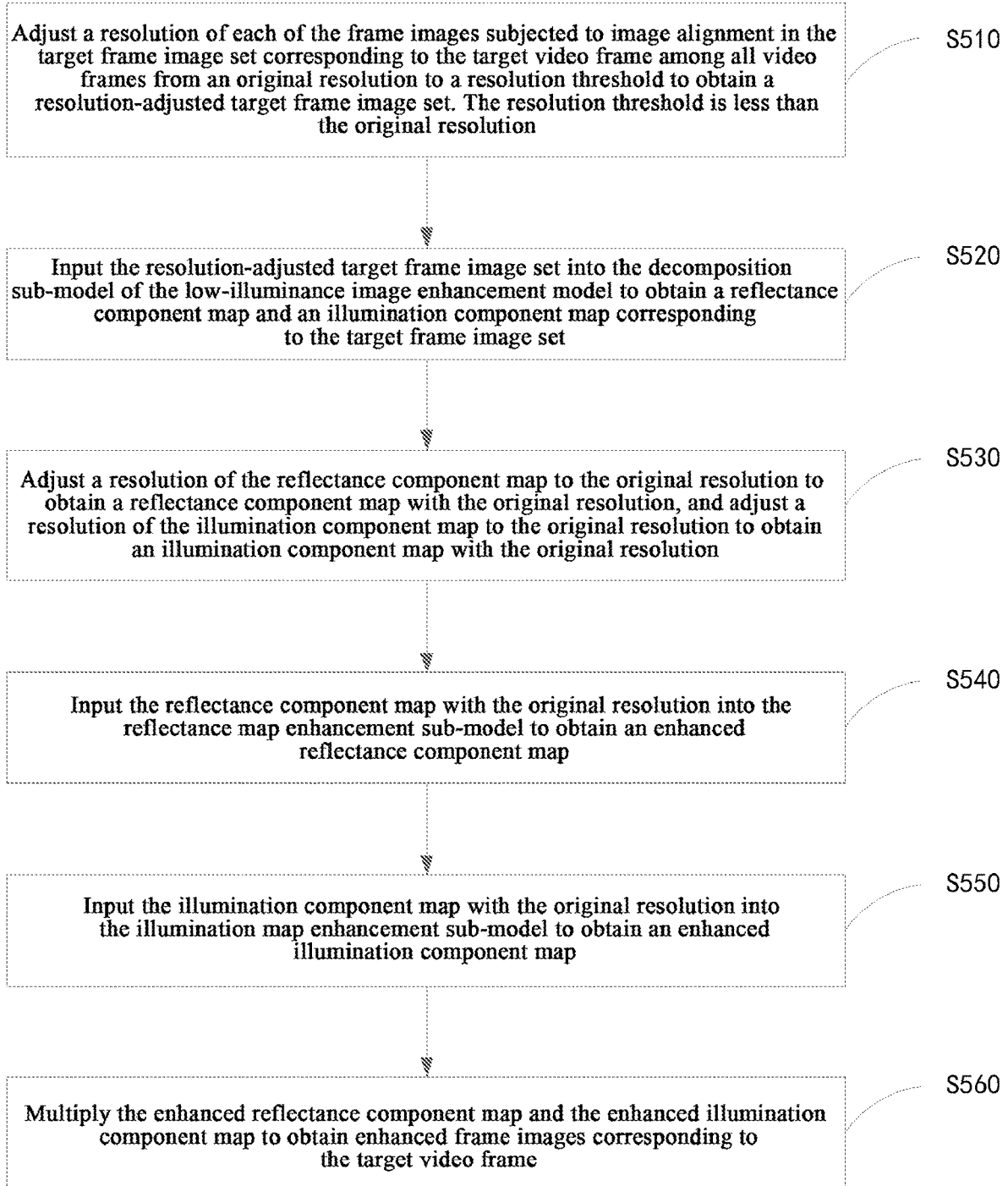

Adjust a resolution of each of the frame images subjected to image alignment in the target frame image set corresponding to the target video frame among all video frames from an original resolution to a resolution threshold to obtain a resolution-adjusted target frame image set. The resolution threshold is less than the original resolution — S510

Input the resolution-adjusted target frame image set into the decomposition sub-model of the low-illuminance image enhancement model to obtain a reflectance component map and an illumination component map corresponding to the target frame image set — S520

Adjust a resolution of the reflectance component map to the original resolution to obtain a reflectance component map with the original resolution, and adjust a resolution of the illumination component map to the original resolution to obtain an illumination component map with the original resolution — S530

Input the reflectance component map with the original resolution into the reflectance map enhancement sub-model to obtain an enhanced reflectance component map — S540

Input the illumination component map with the original resolution into the illumination map enhancement sub-model to obtain an enhanced illumination component map — S550

Multiply the enhanced reflectance component map and the enhanced illumination component map to obtain enhanced frame images corresponding to the target video frame — S560

FIG. 5

LOW-LIGHT VIDEO PROCESSING METHOD, DEVICE AND STORAGE MEDIUM

CROSS-REFERENCE TO RELATED APPLICATIONS

This application is a national stage filing under 35 U.S.C. § 371 of international application number PCT/CN2021/099155, filed Jun. 9, 2021, which claims priority to Chinese patent application No. 202010561289.X filed Jun. 18, 2020. The contents of these applications are incorporated herein by reference in their entirety.

TECHNICAL FIELD

The present disclosure relates to the technical field of video image processing.

BACKGROUND

So far, a lot of studies have shown that video information has accounted for a noticeable proportion in today's information circulation. When shooting a video, the illuminance of the surrounding environment has a great influence on the quality of the video. A low-illuminance video refers to a video which is shot when the illuminance of the surrounding environment is low. Due to the insufficiency of light entering a shooting apparatus as a result of the low illuminance of the surrounding environment during shooting, such a low-illu-minance video usually has problems such as low illumi-nance, low contrast, unclear details and high noise. There-fore, there is an urgent need for a low-illuminance video processing method for enhancing the quality of low-illumi-nance images.

SUMMARY

According to embodiments of the present disclosure, a low-illuminance video processing method, a low-illumi-nance video processing device and a storage medium are provided, which are intended to achieve a function of enhancing the quality of low-illuminance images.

To achieve the above objective, an embodiment of the present disclosure provides a low-illuminance video pro-cessing method, which includes: acquiring a same number of preceding frame images and subsequent frame images corresponding to a current video frame of a low-illuminance video to obtain a frame image set corresponding to the current video frame, and performing traversal on the low-illuminance video to obtain frame image sets corresponding to all video frames; after performing image alignment on all frame images in the frame image sets corresponding to all video frames, inputting the frame image sets into a pre-trained low-illuminance image enhancement model to obtain enhanced frame images; and generating an enhanced video based on the enhanced frame images.

To achieve the above objective, an embodiment of the present disclosure provides a low-illuminance video pro-cessing device, which includes: a memory; a processor; a program, stored in the memory and executable by the processor; and a data bus, configured for communicative connection between the processor and the memory, where the program, when executed by the processor, causes the processor to implement the low-illuminance video process-ing method of any of the embodiments of the present disclosure.

To achieve the above objective, an embodiment of the present disclosure provides a storage medium, configured for computer-readable storage. The storage medium stores one or more programs which, when executed by one or more processors, cause the one or more processors to implement the low-illuminance video processing method of any of the embodiments of the present disclosure.

BRIEF DESCRIPTION OF DRAWINGS

FIG. 1 is a flowchart of a low-illuminance video process-ing method according to an embodiment of the present disclosure.

FIG. 2 is a flowchart of alignment of frame image sets according to an embodiment of the present disclosure.

FIG. 5 is a flowchart of a method for obtaining enhanced frame images based on a low-illuminance image enhance-ment model according to an embodiment of the present disclosure.

DETAILED DESCRIPTION

Figure 3:
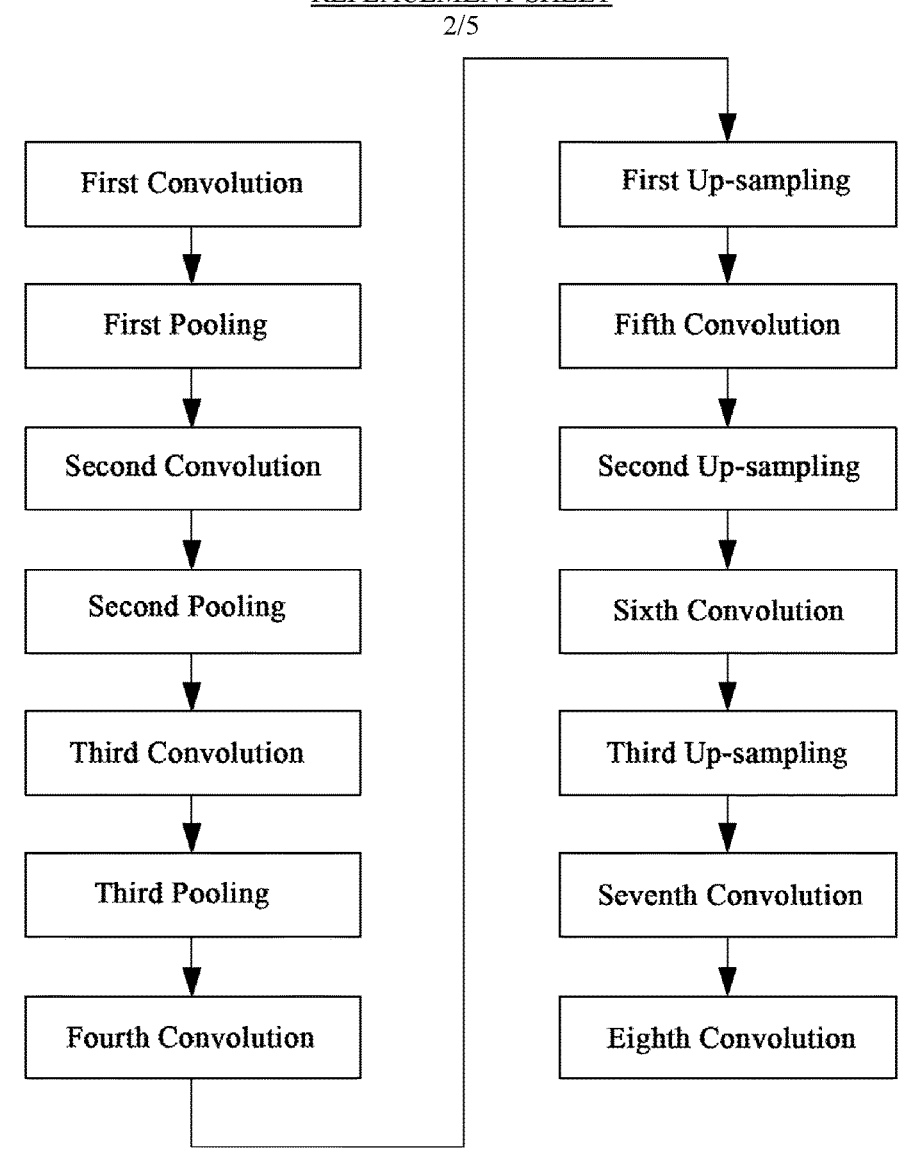
FIG. 3 is a schematic diagram of a motion estimation model according to an embodiment of the present disclo-sure.

It should be understood that the embodiments described herein are merely intended to explain the present disclosure rather than limit the present disclosure.

In the following description, the terms such as "module", "component" or "unit", used to represent elements are merely intended for facilitating the description of the present disclosure, and have no particular meanings themselves. Therefore, "module", "component" or "unit" may be used alone or in combination.

FIG. 1 shows a flowchart of a low-illuminance video processing method according to an embodiment of the present disclosure. The method may be applied to a low-illuminance video processing device, which may be, for example, a mobile terminal, a personal computer, a set-top box, a television, a wearable device or other electronic devices. As shown in FIG. 1, the method includes steps S110 to S130.

At S110, a same number of preceding frame images and subsequent frame images corresponding to a current video frame of a low-illuminance video are acquired to obtain a frame image set corresponding to the current video frame, and traversal is performed on the low-illuminance video to obtain frame image sets corresponding to all video frames.

The low-illuminance video is composed of one or more frames of images (video frames). The preceding frame images corresponding to the current video frame refer to frame images which are located before the current video frame in a time sequence of playing the low-illuminance video. The subsequent frame images corresponding to the current video frame refer to frame images which are located after the current video frame in the time sequence of playing the low-illuminance video. The preceding frame images and the subsequent frame images may be referred to as adjacent frame images of the current video frame. A frame image set corresponding to any video frame (e.g. the current video frame) among all video frames includes: the any video frame, n preceding frame images corresponding to the any video frame and n subsequent frame images corresponding to the any video frame, n being a positive integer greater than or equal to 1. For example, n is less than or equal to 3 and greater than or equal to 1. For example, if n is equal to 1, the frame image set corresponding to the any video frame includes the any video frame, a preceding frame image corresponding to the any video frame and a subsequent frame image corresponding to the any video frame. Correspondingly, acquiring a same number of preceding frame images and subsequent frame images corresponding to a current video frame of a low-illuminance video includes: acquiring a preceding frame image and a subsequent frame image corresponding to a current video frame of a low-illuminance video.

In an embodiment, the low-illuminance video may be a low-illuminance video with identical or similar scene contents (also referred to as motion scene contents). That is, in the low-illuminance video, the scene content of each video frame should be identical or similar. For example, the background of each video frame in the low-illuminance video is identical. For example, the background of each video frame in the low-illuminance video is in a forest, a sea or an identical room. Thus, since the content of each video frame in the low-illuminance video is identical or similar, the acquired preceding frame images and subsequent frame images corresponding to the current video frame in the low-illuminance video are highly similar to the current video frame. When the frame image set composed of the multiple frame images with high similarity is input into a subsequent low-illuminance image enhancement model, it is ensured that the model can obtain a lot of input features due to the simultaneous input of the multiple frame images, while the great interference of features of multiple frame images with great difference with the feature of the current video frame is avoided, increasing the accuracy of input features obtained by the model.

In an embodiment, if the preceding frame images and the subsequent frame images corresponding to the current video frame are different in number, the current video frame may be repeatedly copied as a preceding frame image or a subsequent frame image until the numbers are equal. The low-illuminance video processing device may preset a preset number (n) of preceding frame images and the preset number (n) of subsequent frame images to be acquired for the current video frame. Whether the number of available preceding frame images and the number of subsequent frame images corresponding to the current video frame are equal to the preset number is judged. If so, then the low-illuminance video processing device acquires the preset number of preceding frame images and the preset number of subsequent frame images corresponding to the current video frame, obtaining a frame image set corresponding to the current video frame. If not, and the preceding frame images are less than the subsequent frame images, then the low-illuminance video processing device may repeatedly copy the current video frame until the sum of the number of the copied current video frames and the number of the preceding frame images is equal to the number of the subsequent frame images, and the copied current video frames are used as preceding frame images, so that a frame image set corresponding to the current video frame is obtained. If not, and the subsequent frame images are less than the preceding frame images, then the low-illuminance video processing device may repeatedly copy the current video frame until the sum of the number of the copied current video frames and the number of the subsequent frame images is equal to the number of the preceding frame images, and the copied current video frames are used as subsequent frame images, so that a frame image set corresponding to the current video frame is obtained. Moreover, traversal is performed on the low-illuminance video to obtain a frame image set corresponding to each of the video frames included in the low-illuminance video.

In another embodiment, if n is less than or equal to 3 and greater than or equal to 1, because the low-illuminance video usually includes more than three video frames, only the number of the preceding frame images corresponding to the first frame image and the number of the subsequent frame images corresponding to the last frame image (the tail frame image) in the low-illuminance video are different from the preset number n. Therefore, for a low-illuminance video, the low-illuminance video processing device may directly copy a current video frame as a preceding frame image n times when it is determined that the current video frame is a first frame image of the low-illuminance video, obtaining a frame image set corresponding to the current video frame. Similarly, the low-illuminance video processing device may directly copy a current video frame as a subsequent frame image n times when it is determined that the current video frame is a last frame image of the low-illuminance video, obtaining a frame image set corresponding to the current video frame. For example, the low-illuminance video processing device uses a first frame identifier to identify the first frame image of the low-illuminance video and a last frame identifier to identify the last frame image of the low-illuminance video. Therefore, if the low-illuminance video processing device acquires a current video frame with the first frame identifier, the low-illuminance video processing device can directly copy the current video frame as a preceding frame image n times, obtaining a frame image set corresponding to the current video frame. Similarly, if the low-illuminance video processing device acquires a current video frame with the last frame identifier, the low-illumi-nance video processing device can directly copy the current video frame as a subsequent frame image n times, obtaining a frame image set corresponding to the current video frame. Thus, the operation of judging whether the number of preceding frame images and the number of subsequent frame images available in the current video frame are equal to the preset number is avoided, simplifying the flow of obtaining frame image sets and reducing overhead of the device.

It should be noted that when the present embodiment executes any of the methods for a low-illuminance video with identical or similar scene contents (also referred to as motion scene contents), for a low-illuminance video with different scene contents, by setting a scene switching trigger signal, the low-illuminance video processing device can determine that switching has taken place between the scene contents in the low-illuminance video when receiving the scene switching trigger signal, and then, with a low-illumi-nance video segment subjected to scene content switching as a new low-illuminance video, executes any of the methods of the present embodiment on the new low-illuminance video.

In an embodiment, for example, assuming that the preset number of to-be-acquired preceding frame images and the preset number of subsequent frame images corresponding to a current video frame are equal to 1, if the current video frame is a first frame in a motion scene to which the current video frame belongs, then the frame image of the current video frame is used as a preceding frame image corresponding to the current video frame; or if the current video frame is a last frame in the motion scene to which the current video frame belongs, then the frame image of the current video frame is used as a subsequent frame image corresponding to the current video frame.

At S120, after image alignment is performed on all frame images in the frame image sets corresponding to all video frames, the frame image sets are input into a pre-trained low-illuminance image enhancement model to obtain enhanced frame images.

The low-illuminance video processing device respectively performs image alignment on all frame images in the frame image set corresponding to each of the video frames to obtain an aligned frame image set corresponding to each video frame. The aligned frame image set corresponding to each video frame is input into the pre-trained low-illuminance image enhancement model to obtain enhanced frame images corresponding to each video frame.

In an embodiment, FIG. 2 shows a flowchart of alignment of frame image sets according to an embodiment of the present disclosure. As shown in FIG. 2, the process of performing, by the low-illuminance video processing device, image alignment on all frame images in frame image sets corresponding to all video frames may include steps S210 to S230.

At S210, a target video frame among all video frames is used as a reference frame image to perform motion estimation on each supplementary frame image in the frame image set corresponding to the target video frame, so as to sequentially determine a motion vector corresponding to each supplementary frame image in the frame image set corresponding to the target video frame. The supplementary frame images are preceding frame images and subsequent frame images in the frame image sets corresponding to the target video frames.

The target video frame is each video frame among all video frames, and the target video frames include current video frames. The motion vector corresponding to the supplementary frame image represents a motion deviation of each pixel in the supplementary frame image from each pixel in the target frame image, i.e. relative displacement. There are a variety of implementations for the low-illuminance video processing device using a target video frame among all video frames as a reference frame image to perform motion estimation (ME) so as to sequentially determine a motion vector (MV) corresponding to each supplementary frame image in the frame image set corresponding to the target video frame, and the present embodiment is illustrated taking the following three implementations as examples.

In the first implementation, for each supplementary frame image in the frame image set corresponding to a target video frame, the low-illuminance video processing device inputs the target video frame and the supplementary frame image into a pre-trained motion estimation model to obtain a motion vector corresponding to the supplementary frame image, and thereby a motion vector corresponding to each supplementary frame image in the frame image set corresponding to the target video frame is obtained.

The number of the pre-trained motion estimation models is one less than the number of the frame images in the frame image set, that is, there are 2n motion estimation models, and all motion estimation models are identical. The low-illuminance video processing device inputs a target video frame and each supplementary frame image in the frame image set corresponding to the target video frame into a pre-trained motion estimation model to obtain motion vectors each corresponding to a respective one of the supplementary frame images, which is repeatedly performed to obtain motion vector each corresponding to a respective one of supplementary frame images in each frame image set corresponding to a respective one of the video frames.

For example, assuming that n is equal to 1, there are three frame images in a frame image set corresponding to a target video frame, that is, the frame image set includes the target video frame 1_lowt, a preceding frame image 1_lowt−1, and a subsequent frame image 1_lowt+1, the preceding frame image 1_lowt−1 and the subsequent frame image 1_lowt+1 being supplementary frame images. There are two motion estimation models. The low-illuminance video processing device inputs the target video frame 1_lowt and the preceding frame image 1_lowt−1 into one motion estimation model to obtain a motion vector corresponding to the preceding frame image 1_lowt−1. The low-illuminance video processing device inputs the target video frame 1_lowt and the subsequent frame image 1_lowt+1 into the other motion estimation model to obtain a motion vector corresponding to the subsequent frame image 1_lowt+1.

The motion estimation models are obtained by training a video frame and n preceding frame images and n subsequent frame images corresponding to the video frame in a low-illuminance video according to a first loss function. Input parameters of the first loss function include: the video frame, the n preceding frame images and the n subsequent frame images corresponding to the video frame, first motion vectors respectively corresponding to the n preceding frame images corresponding to the video frame, and second motion vectors respectively corresponding to the n subsequent frame images corresponding to the video frame.

For example, the motion estimation models are convolutional neural network models. The training process of the motion estimation models may include the following steps. A video frame and n preceding frame images and n subsequent frame images corresponding to the video frame in a low-illuminance video are input into initial convolutional neural network models to obtain first motion vectors respectively corresponding to the n preceding frame images and second motion vectors respectively corresponding to the n subsequent frame images. The video frame, the n preceding frame images and the n subsequent frame images corresponding to the video frame, the first motion vectors and the second motion vectors are input into the first loss function to obtain a loss result. If the loss result is not within a function convergence range, network parameters of the initial convolutional neural network models are adjusted to obtain adjusted convolutional neural network models. The input operation is repeated until the loss result of the first loss function falls into the function convergence range, determining that obtained convolutional neural network models are the motion estimation models.

In an embodiment, taking n=1 as an example, the motion estimation models are obtained by training a video frame and a preceding frame image and a subsequent frame image corresponding to the video frame in a low-illuminance video according to the first loss function. The first loss function $LOSS_{ME}$ meets:

$$LOSS_{ME} = MSE(l\_low^t, W_b(l\_low_{t-1}, f_{t-1 \to t})) + MSE(l\_low_t, W_b(l\_low_{t+1}, f_{t+1 \to t}));$$

$l\_low_t$ represents a video frame. $l\_low_{t-1}$ represents a preceding frame image corresponding to the video frame. $l\_low_{t-1}$ represents a subsequent frame image corresponding to the video frame. t represents the time of the video frame. t−1 represents the time of the preceding frame image corresponding to the video frame. t+1 represents the time of the subsequent frame image corresponding to the video frame. $f_{t-1 \to t}$ represents a motion vector corresponding to the preceding frame image determined by one motion estimation model. $f_{t-1 \to t}$ represents a motion vector corresponding to the subsequent frame image determined by another motion estimation model. MSE represents a mean squared error. $W_b$ $(l\_low_{t-1}, f_{t-1 \to t})$ represents a preceding frame image which is determined after motion compensation (e.g. warping) is performed on the preceding frame image based on the motion vector corresponding to the preceding frame image determined by one motion estimation model. $W_b$ $(l\_low_{t+1}, f_{t+1 \to t})$ represents a subsequent frame image which is determined after motion compensation (e.g. warping) is performed on the subsequent frame image based on the motion vector corresponding to the subsequent frame image determined by the other motion estimation model.

Thus, since the motion estimation models for respectively determining the motion vector corresponding to each supplementary frame image are identical, the motion estimation models can be obtained by training only once. It can also be understood that multiple motion estimations may share a group of network parameters, which reduces resource consumption caused by the training of the motion estimation models.

In the present embodiment, as shown in FIG. 3, the process of determining a motion vector of a supplementary frame image by a motion estimation model may include the following flow. An activation function is used to perform first convolution on a target video frame and a supplementary frame image in sequence twice, the using the activation function to perform first convolution being conv&LeakyRelU 32Out. conv&LeakyRelU 32Out means using the activation function LeakyRelU to perform convolution, the number of output channels being 32. First pooling is performed on the data subjected to the first convolution. The first pooling is MaxPooling 2X, which means reducing the width and height of an image by two times. A first activation function is used to perform second convolution on the data subjected to the first pooling twice, the using a first activation function to perform second convolution being conv&LeakyRelU 64Out. conv&LeakyRelU 64Out means using the first activation function LeakyRelU to perform convolution, the number of output channels being 64. Second pooling is performed on the data subjected to the second convolution. The second pooling is MaxPooling 2X, which means reducing the width and height of an image by two times. The first activation function is used to perform third convolution on the data subjected to the second pooling twice, the using the first activation function to perform third convolution being conv&LeakyRelU 128Out. conv&LeakyRelU 128Out means using the first activation function LeakyRelU to perform convolution, the number of output channels being 128. Third pooling is performed on the data subjected to the third convolution. The third pooling is MaxPooling 2X, which means reducing the width and height of an image by two times. The first activation function is used to perform fourth convolution on the data subjected to the third pooling twice, the using the first activation function to perform fourth convolution being conv&LeakyRelU 256Out. conv&LeakyRelU 256Out means using the first activation function LeakyRelU to perform convolution, the number of output channels being 256. First up-sampling is performed on the data subjected to the fourth convolution. The first up-sampling is Bilinear 2X, which means using bilinear interpolation to increase the width and height of an image by two times. The first activation function is used to perform fifth convolution on the data subjected to the first up-sampling twice, the using the first activation function to perform fifth convolution being conv&LeakyRelU 128Out. conv&LeakyRelU 128Out means using the first activation function LeakyRelU to perform convolution, the number of output channels being 128. Second up-sampling is performed on the data subjected to the fifth convolution. The second up-sampling is Bilinear 2X, which means using bilinear interpolation to increase the width and height of an image by two times. The first activation function is used to perform sixth convolution on the data subjected to the second up-sampling twice, the using the first activation function to perform sixth convolution being conv&LeakyRelU 64Out. conv&LeakyRelU 64Out means using the first activation function LeakyRelU to perform convolution, the number of output channels being 64. Third up-sampling is performed on the data subjected to the sixth convolution. The third up-sampling is Bilinear 2X, which means using bilinear interpolation to increase the width and height of an image by two times. The first activation function is used to perform seventh convolution on the data subjected to the third up-sampling, the using the first activation function to perform seventh convolution being conv&LeakyRelU 32Out. conv&LeakyRelU 32Out means using the first activation function LeakyRelU to perform convolution, the number of output channels being 32. A second activation function is used to perform eighth convolution on the data subjected to the seventh convolution, the using a second activation function to perform eighth convolution being conv& Tanh 2Out. conv&Tanh 2Out means using the second activation function Tanh to perform convolution, the number of output channels being 2.

In the second implementation, the low-illuminance video processing device inputs a target video frame and a preceding frame image into a pre-trained preceding frame image motion estimation model to obtain a motion vector corresponding to the preceding frame image, and inputs the target video frame and a subsequent frame image into a pre-trained subsequent frame image motion estimation model to obtain a motion vector corresponding to the subsequent frame image.

The number of the pre-trained motion estimation models is one less than the number of the frame images in the frame image set, that is, there are 2n motion estimation models, and all motion estimation models are different. The 2n motion estimation models may be divided into two types of motion estimation models, one type is preceding frame image motion estimation models, the number of which is n and each of which corresponds to a preceding frame image, and the other type is subsequent frame image motion estimation models, the number of which is n and each of which corresponds to a subsequent frame image.

Respectively using a target video frame and a different preceding frame image as a supplementary frame image in a frame image set corresponding to the target video frame as inputs of a model, the low-illuminance video processing device inputs the target video frame and the preceding frame image into a pre-trained preceding frame image motion estimation model corresponding to the preceding frame image to obtain a motion vector corresponding to the preceding frame image. Respectively using the target video frame and a different subsequent frame image as a supplementary frame image in the frame image set corresponding to the target video frame as inputs of a model, the low-illuminance video processing device inputs the target video frame and the subsequent frame image into a pre-trained subsequent frame image motion estimation model corresponding to the subsequent frame image to obtain a motion vector corresponding to the subsequent frame image. This process is repeatedly executed until motion vectors each corresponding to a respective preceding frame image and motion vectors each corresponding to a respective subsequent frame image in a frame image set corresponding to each of the video frames are obtained.

For example, assuming that n is equal to 1, there are three frame images in a frame image set corresponding to a target video frame, that is, the frame image set includes the target video frame 1_lowt, a preceding frame image 1_lowt−1, and a subsequent frame image 1_lowt+1, the preceding frame image 1_lowt−1 and the subsequent frame image 1_lowt+1 being supplementary frame images. There are two motion estimation models, which are a preceding frame image motion estimation model ME_1 and a subsequent frame image motion estimation model ME_2. The low-illuminance video processing device inputs the target video frame 1_lowt and the preceding frame image 1_lowt−1 into the preceding frame image motion estimation model ME_1 to obtain a motion vector corresponding to the preceding frame image 1_lowt−1. The low-illuminance video processing device inputs the target video frame 1_lowt and the subsequent frame image 1_lowt+1 into the subsequent frame image motion estimation model ME_2 to obtain a motion vector corresponding to the subsequent frame image 1_lowt+1.

Among the 2n motion estimation models, each of the n preceding frame image motion estimation models corresponding to the n preceding frame images in the frame image set corresponding to the target video frame is obtained by training a video frame and an $m^{th}$ preceding frame image (i.e. an image of an $m^{th}$ video frame counted backward from the video frame) corresponding to the video frame in a low−illuminance video according to an $m^{th}$ second loss function, m being a positive integer less than or equal to n and greater than or equal to 1. Input parameters of the $m^{th}$ second loss function include the video frame, the $m^{th}$ preceding frame image corresponding to the video frame, and a third motion vector corresponding to the $m^{th}$ preceding frame image. Each of the n subsequent frame image motion estimation models corresponding to the n subsequent frame images in the frame image set is obtained by training the video frame and an $i^{th}$ subsequent frame image (i.e. an image of an $i^{th}$ video frame counted forward from the video frame) corresponding to the video frame according to an $i^{th}$ third loss function, i being a positive integer less than or equal to n and greater than or equal to 1. Input parameters of the $i^{th}$ third loss function include the video frame, the $i^{th}$ frame of subsequent frame image corresponding to the video frame, and a fourth motion vector corresponding to the $i^{th}$ frame of subsequent frame image. For example, the process of training each of the 2n motion estimation models may be substantially identical. The present embodiment is illustrated taking the process of training an $m^{th}$ preceding frame image motion estimation model among n preceding frame image motion estimation models corresponding to n preceding frame images in a frame image set as an example. The training process includes the following steps. A video frame in a low-illuminance video and an $m^{th}$ frame of preceding frame image corresponding to the video frame are input into an initial convolutional neural network model to obtain a third motion vector corresponding to the $m^{th}$ frame of preceding frame image. The video frame, the $m^{th}$ frame of preceding frame image and the third motion vector are input into an $m^{th}$ second loss function to obtain a loss result. If the loss result is not within a function convergence range, network parameters of the initial convolutional neural network model are adjusted to obtain an adjusted convolutional neural network model. The input operation is repeated until the loss result of the second loss function falls into the function convergence range, determining that an obtained convolutional neural network model is the $m^{th}$ preceding frame image motion estimation model.

In an implementation of the present embodiment, taking n=1 as an example, two motion estimation models include a third preceding frame image motion estimation model corresponding to a preceding frame image and a fourth subsequent frame image motion estimation model corresponding to a subsequent frame image in a frame image set. The third preceding frame image motion estimation model is obtained by training a video frame and a preceding frame image corresponding to the video frame in a low-illuminance video according to a second loss function. The second loss function $LOSS_{ME\_1}$ meets:

$$LOSS_{ME\_1}=MSE(l\_low_t, W_b(l\_low_{t-1}, f_{t-1 \rightarrow t}));$$

$1\_low_t$ represents a video frame. $1\_low_{t-1}$ represents a preceding frame image corresponding to the video frame. t represents the time of the video frame. t−1 represents the time of the preceding frame image corresponding to the video frame. $f_{t-1 \rightarrow t}$ represents a motion vector corresponding to the subsequent frame image determined by another motion estimation model. MSE represents a mean squared error. $W_b$ ($1\_low_{t-1}$, $f_{t-1 \rightarrow t}$) represents a preceding frame image which is determined after motion compensation (e.g. warping) is performed on the preceding frame image based on the motion vector corresponding to the preceding frame image determined by one motion estimation model.

The fourth subsequent frame image motion estimation model is obtained by training the video frame and a subsequent frame image corresponding to the video frame according to a third loss function. The third loss function $LOSS_{ME\_2}$ meets:

$$LOSS_{ME\_2}=MSE(l\_low_t, W_b(l\_low_{t+1}, f_{t+1 \rightarrow t}))$$

$1\_low_t$ represents a video frame. $1\_low_{t+1}$ represents a subsequent frame image corresponding to the video frame. t+1 represents the time of the subsequent frame image corresponding to the video frame. $f_{t+1 \rightarrow t}$ represents a motion vector corresponding to the subsequent frame image determined by another motion estimation model. MSE represents a mean squared error. $W_b$ ($1\_low_{t+1}$, $f_{t+1 \rightarrow t}$) represents a subsequent frame image which is determined after motion compensation (e.g. warping) is performed on the subsequent frame image based on the motion vector corresponding to the subsequent frame image determined by the other motion estimation model.

Thus, since the motion estimation model for determining a motion vector corresponding to each supplementary frame image is trained separately, the accuracy of the motion vector corresponding to each supplementary frame image determined based on a different motion estimation model is high.

In the third implementation, the low-illuminance video processing device inputs a target video frame and each preceding frame image in a frame image set corresponding to the target video frame into a preceding frame image motion estimation model to obtain a motion vector corresponding to each preceding frame image. Moreover, the low-illuminance video processing device inputs the target video frame and each subsequent frame image in the frame image set corresponding to the target video frame into a subsequent frame image motion estimation model to obtain a motion vector corresponding to each subsequent frame image.

The preceding frame image motion estimation model is referred to as a fifth motion estimation model, and the subsequent frame image motion estimation model is referred to as a sixth motion estimation model. The fifth motion estimation model is different from the sixth motion estimation model. The fifth motion estimation model may be understood as a motion estimation model corresponding to all preceding frame images in a frame image set, and the sixth motion estimation model can be understood as a motion estimation model corresponding to all subsequent frame images in the frame image set. The process of training the fifth motion estimation model and the sixth motion estimation model may refer to the process of training the motion estimation models in the first implementation or the process of training the motion estimation models in the second implementation, and therefore will not be repeated in the present embodiment.

The method used in the present embodiment to determine a motion vector corresponding to each supplementary frame image in the frame image set corresponding to a target video frame should include, but not limited to, the above three implementations, and may also be implemented in other ways, which will not be limited by the present embodiment.

At S220, motion compensation is respectively performed on each supplementary frame image based on the motion vector corresponding to each supplementary frame image, so as to determine each supplementary frame image subjected to motion compensation.

The low-illuminance video processing device respectively moves each pixel block (or pixel) in each supplementary frame image based on the motion vector corresponding to each supplementary frame image. In an embodiment, motion compensation (MC) may be implemented by warping. The low-illuminance video processing device may respectively perform warping on each supplementary frame image in the frame image set corresponding to the target video frame based on the motion vector corresponding to the supplementary frame image, so as to determine a supplementary frame image subjected to motion compensation which corresponds to the supplementary frame image. For example, the low-illuminance video processing device may move each pixel in the supplementary frame image based on the motion vector corresponding to the supplementary frame image, so that the position of each pixel in the moved supplementary frame image is a position after the motion of the original position according to the motion vector, and the moved supplementary frame image is a supplementary frame image subjected to motion compensation. For example, the low-illuminance video processing device adds the current position of each pixel in the supplementary frame image and the motion vector corresponding to the supplementary frame image to determine a target position of the pixel, and moves the pixel in the supplementary frame image from the current position to the target position.

At S230, the target video frame and each supplementary frame image subjected to motion compensation are concatenated according to channels to obtain an aligned frame image set corresponding to the target video frame.

In an embodiment, the low-illuminance video processing device concatenates the target video frame and the supplementary frame images subjected to motion compensation in the frame image set corresponding to the target video frame according to a red (R) channel, a green (G) channel and a blue (B) channel to obtain an aligned frame image set corresponding to the target video frame. The frame image set is used as an input of the subsequent low-illuminance image enhancement model. By concatenating the target video frame and each supplementary frame image subjected to motion compensation according to the R, G and B channels, compared with output methods such as concatenating images according to rows and columns, the present disclosure can preserve the original feature information of the frame images to the max without destroying the feature information of the frame images, so that image information in a subsequent frame image set input to the low-illuminance image enhancement model will be richer, which helps to improve the effect of frame image enhancement.

Figure 4:
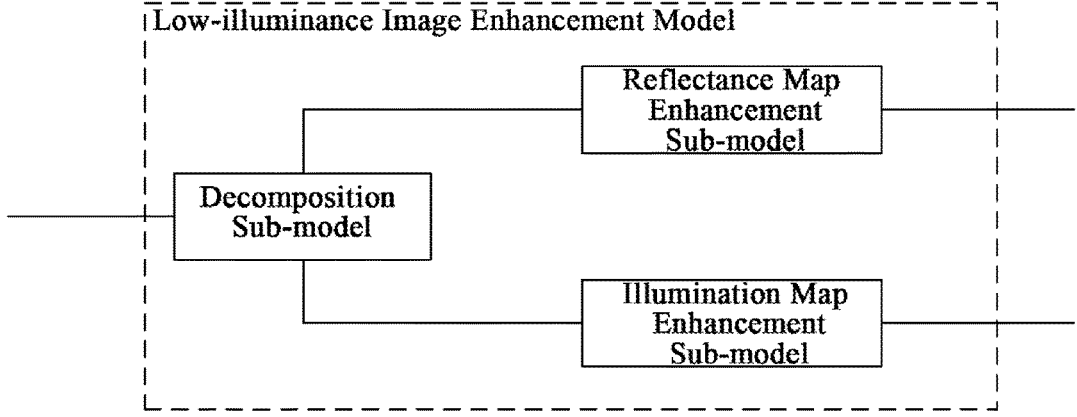
FIG. 4 is a schematic diagram of a low-illuminance image enhancement model according to an embodiment of the present disclosure.

In an embodiment, the low-illuminance image enhancement model may be used to obtain an enhanced frame image corresponding to the target video frame based on the input aligned frame image set corresponding to the target video frame. For example, the low-illuminance image enhancement model may use the principle of Retinex. For example, the low-illuminance image enhancement model may be a KinD network model. In an embodiment, the low-illuminance image enhancement model may be obtained by training based on a convolutional neural network, and may be a convolutional neural network model. As shown in FIG. 4, the 30) low-illuminance image enhancement model (also referred to as RetinexNet) includes: a decomposition sub-model (DecomNet), a reflectance map enhancement sub-model (RestorationNet), and a light map enhancement sub-model (AdjustNet). Part of output data of the decomposition sub-model is input data of the reflectance map enhancement sub-model, and the other part of the output data of the decomposition sub-model is input data of the light map enhancement sub-model. The decomposition sub-model is used to decompose an input aligned frame image set corresponding to a target video frame into a reflectance component map R and an illumination component map L according to the principle of Retinex. The reflectance map enhancement sub-model is used to perform denoising, detail enhancement and brightness enhancement on the reflectance component map obtained by decomposition in the decomposition sub-model to obtain an enhanced reflectance component map. The light map enhancement sub-model is used to perform brightness enhancement on the illumination component map obtained by decomposition in the decomposition sub-model to obtain an enhanced illumination component map.

FIG. 5 shows a flowchart of a method for obtaining enhanced frame images based on a low-illuminance image enhancement model according to the present embodiment. As shown in FIG. 5, after the low-illuminance video processing device performs image alignment on all frame images in frame image sets corresponding to all video frames, the process of inputting the frame image sets into a pre-trained low-illuminance image enhancement model to obtain enhanced frame images may include steps S510 to S560.

At S510, a resolution of each of the frame images subjected to image alignment in the target frame image set corresponding to the target video frame among all video frames is adjusted from an original resolution to a resolution threshold to obtain a resolution-adjusted target frame image set. The resolution threshold is less than the original resolution.

Each of the frame images subjected to image alignment in the target frame image set is either the target frame image or the complementary frame image (either the preceding frame image or the subsequent frame image) included in the aligned target frame image set. In an embodiment, the low-illuminance video processing device performs size changing (referred to as resizing) on each frame image in the aligned target frame image set to obtain each resized frame image, and the resized frame image set is a resolution-adjusted target frame image set. The resolution of each resized frame image is the resolution threshold, the range of which is 256×256 to 512×512. For example, the resolution threshold is 256×256 or 512×512. For example, a nearest interpolation algorithm may be used for resizing.

By decreasing the resolution of each frame image in the aligned target frame image set, the low-illuminance image enhancement model may be trained using low-resolution frame images, which increases the speed of training the low-illuminance image enhancement model and reduces the number of network parameters of the low-illuminance image enhancement model.

At S520, the resolution-adjusted target frame image set is input into the decomposition sub-model of the low-illuminance image enhancement model to obtain a reflectance component map and an illumination component map corresponding to the target frame image set.

In an embodiment, the decomposition sub-model of the low-illuminance image enhancement model is obtained by training a low-illuminance video frame in a low-illuminance video and a ground truth video frame according to a fourth loss function. Input parameters of the fourth loss function include: a low-illuminance video frame, a ground truth video frame, a reflectance component map corresponding to the low-illuminance video frame, an illumination component map corresponding to the low-illuminance video frames, a reflectance component map corresponding to the ground truth video frame, and an illumination component map corresponding to the ground truth video frame. The ground truth video frame is a normal-light video frame, the illumination of which is an illumination threshold, and the illumination threshold may be 6 illuminations.

For example, the decomposition sub-model is a convolutional neural network model. The process of training the decomposition sub-model may include the following steps. A low-illuminance video frame and a ground truth video frame are input into an initial convolutional neural network model to obtain a reflectance component map and an illumination component map corresponding to the low-illuminance video frame and a reflectance component map and an illumination component map corresponding to the ground truth video frame. The low-video frame, the ground truth video frame, the reflectance component map and the illumination component map corresponding to the low-illuminance video frame and the reflectance component map and the illumination component map corresponding to the ground truth video frame are input into the fourth loss function to obtain a loss result. If the loss result is not within a function convergence range, network parameters of the initial convolutional neural network model are adjusted to obtain an adjusted convolutional neural network model. The input operation is repeated until the loss result of the fourth loss function falls into the function convergence range, determining that an obtained convolutional neural network model is the decomposition sub-model.

In an embodiment, the fourth loss function $loss_{decom}$ meets:

$$loss_{decom} = loss_{decom}^{rec} + loss_{decom}^{rs} + loss_{decom}^{is} + loss_{decom}^{mc}$$

$$loss_{decom}^{rec} = \|R_{low} - R_{GT}\|_2^2$$

$$loss_{decom}^{rs} = \|I_{low} - R_{low} \circ L_{low}\|_1 + \|I_{GT} - R_{GT} \circ L_{GT}\|_1$$

$$loss_{decom}^{is} = \left\| \frac{\nabla L_{low}}{\max(|\nabla L_{low}|, 0.01)} \right\|_1 + \left\| \frac{\nabla L_{GT}}{\max(|\nabla L_{GT}|, 0.01)} \right\|_1$$

$$loss_{decom}^{mc} = \|(|\nabla L_{low}| + |\nabla L_{GT}|) \circ \exp(-10 \circ (|\nabla L_{low}| + |\nabla L_{GT}|))\|_1$$

In the above formula, $I_{low}$ represents a low-illuminance video frame input to the decomposition sub-model; $I_{GT}$ represents a ground truth video frame input to the decomposition sub-model; $R_{low}$ represents a reflectance component map corresponding to the low-illuminance video frame; $L_{low}$ represents an illumination component map corresponding to the low-illuminance video frame; $R_{GT}$ represents a reflectance component map corresponding to the ground truth video frame; $L_{GT}$ represents an illumination component map corresponding to the ground truth video frame; $|\cdot|$ represents an absolute value; $\circ$ represents point multiplication; $\nabla$ represents a horizontal and vertical gradient sum; $\|\cdot\|_1$ represents 1-norm; $\|\cdot\|_2$ represents 2-norm; max represents maximizing; and exp represents exponentiating.

Figure 6:
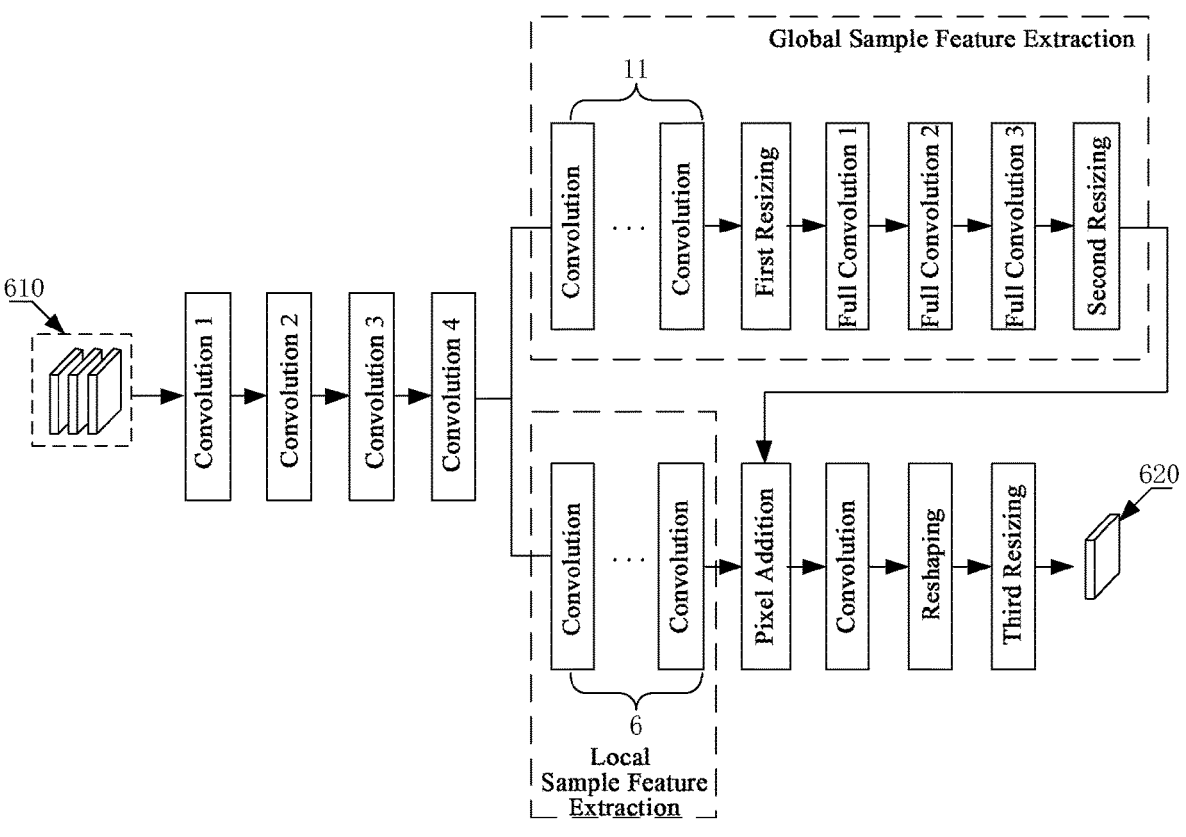
FIG. 6 is a partial schematic diagram of a low-illuminance image enhancement model according to an embodiment of the present disclosure.

In the present embodiment, as shown in FIG. 6, the process of obtaining a luminance component map by decomposition in the decomposition sub-model may include the following steps. Four convolutions (including convolution 1, convolution 2, convolution 3, and convolution 4) with a stride parameter of 2 are sequentially performed on the resolution-adjusted target frame image set 610 obtained in the step of S510. The four convolutions include conv 3In8Out, conv 8In16Out, conv 16In32Out, and conv32In64Out. conv 3In8Out means that there are 3 input channels and 8 output channels in the convolution; conv 8In16Out means that there are 8 input channels and 16 output channels in the convolution; conv 16In32Out means that there are 16 input channels and 32 output channels in the convolution; and conv32In64Out means that there are 32 input channels and 64 output channels in the convolution. Global sample feature extraction (Global) and local sample feature extraction (Local) are respectively performed on data of the four convolutions.

The global sample feature extraction includes performing eleven convolutions on the data of the four convolutions, each convolution being conv 64In64Out. conv 64In64Out means that there are 64 input channels and 64 output channels in the convolution. First resizing is performed on the data subjected to the eleven convolutions. The first resizing resize [1,1024] means that the data subjected to the eleven convolutions are stretched and tiled into a one-dimensional array. Three full convolutions (including full convolution 1, full convolution 2, and full convolution 3) are performed on the data subjected to the first resizing. The three full convolutions include FC 1024In256Out, FC 256In128Out, and FC 128In64Out. FC 1024In256Out means that there are 1024 input channels and 256 output channels in the full convolution; FC 256In128Out means that there are 256 input channels and 128 output channels in the full convolution; and FC 128In64Out means that there are 128 input channels and 64 output channels in the full convolution. Second resizing is performed on the data subjected to the three full convolutions. The second resizing resize [1,1,1,64] means that the size of the data subjected to the three full convolutions is transformed into [1,1,1,64]. The local sample feature extraction includes performing six convolutions on the data of the four convolutions, each convolution being conv 64In64Out. conv 64In64Out means that there are 64 input channels and 64 output channels in the convolution. Addition of pixels at corresponding positions (also referred to as pixel addition) is performed on the data subjected to the local sample feature extraction and the data subjected to the global sample feature extraction. The addition of pixels at corresponding positions Add [1,16,16,64] means that the size is transformed into [1,16,16,64] after pixel addition. Convolution is performed on the data subjected to the addition of pixels at corresponding positions, and the convolution is conv 64In256Out. Reshaping is performed on the data subjected to the convolution. The reshaping is reshape [1,256,256,1]. Third resizing is performed on the data subjected to the reshaping. The third resizing resize [1,256,256,1] means ensuring that the output size is [1,256,256,1]. The data subjected to the third resizing represents a luminance component map 620.

At S530, a resolution of the reflectance component map is adjusted to the original resolution to obtain a reflectance component map with the original resolution. A resolution of the illumination component map is adjusted to the original resolution to obtain an illumination component map with the original resolution.

The low-illuminance video processing device acquires the original resolution of the reflectance component map obtained by the decomposition sub-model of the low-illuminance image enhancement model, and resizes the reflectance component map to obtain a resized reflectance component map, the resolution of which is the original resolution. In the same way, an illumination component map with an original resolution is obtained. For example, the nearest interpolation algorithm may be used for the resizing.

At S540, the reflectance component map with the original resolution is input into the reflectance map enhancement sub-model to obtain an enhanced reflectance component map.

In an embodiment, the reflectance map enhancement sub-model of the low-illuminance image enhancement model is obtained by training a specific reflectance component map corresponding to a low-illuminance video frame according to a fifth loss function. Input parameters of the fifth loss function include: a specific reflectance component map corresponding to a ground truth video frame and an enhanced reflectance component map obtained by inputting the specific reflectance component map corresponding to the low-illuminance video frame into the reflectance map enhancement sub-model. The specific reflectance component map corresponding to the low-illuminance video frame is a reflectance component map obtained by inputting the low-illuminance video frame into the trained decomposition sub-model, and the specific reflectance component map corresponding to the ground truth video frame is a reflectance component map obtained by inputting the ground truth video frame into the trained decomposition sub-model.

For example, the reflectance map enhancement sub-model is a convolutional neural network model. The process of training the reflectance map enhancement sub-model may include the following steps. A specific reflectance component map corresponding to a low-illuminance video frame is input into an initial convolutional neural network model to obtain an enhanced reflectance component map. The enhanced reflectance component map and a specific reflectance component map corresponding to a ground truth video frame are input into the fifth loss function to obtain a loss result. If the loss result is not within a function convergence range, network parameters of the initial convolutional neural network model are adjusted to obtain an adjusted convolutional neural network model. The input operation is repeated until the loss result of the fifth loss function falls into the function convergence range, determining that an obtained convolutional neural network model is the reflectance map enhancement sub-model.

In an embodiment, the fifth loss function $loss_{Re}$ meets:

$$loss_{Re} = \|R_{Re} + R_{GT}\|_2^2 + (1 - SSIM(R_{Re}, R_{GT})) + \|\nabla R_{Re} - \nabla R_{GT}\|_2^2$$

$R_{GT}$ represents the reflectance component map corresponding to the ground truth video frame. $R_{Re}$ represents the enhanced reflectance component map. SSIM means calculating structural similarity loss.

At S550, the illumination component map with the original resolution is input into the illumination map enhancement sub-model to obtain an enhanced illumination component map.

In an embodiment, the illumination map enhancement sub-model of the low-illuminance image enhancement model is obtained by training a specific illumination component map corresponding to a low-illuminance video frame according to a sixth loss function. Input parameters of the sixth loss function include: a specific illumination component map corresponding to a ground truth video frame, the specific illumination component map corresponding to the low-illuminance video frame, and an enhanced illumination component map obtained by inputting the specific illumination component map corresponding to the low-illuminance video frame into the illumination map enhancement sub-model. The specific illumination component map corresponding to the low-illuminance video frame is an illumination component map obtained by inputting the low-illuminance video frame into the trained decomposition sub-model, and the specific illumination component map corresponding to the ground truth video frame is an illumination component map obtained by inputting the ground truth video frame into the trained decomposition sub-model.

For example, the illumination map enhancement sub-model is a convolutional neural network model. The process of training the illumination map enhancement sub-model may include the following steps. A specific illumination component map corresponding to a low-illuminance video frame is input into an initial convolutional neural network model to obtain an enhanced illumination component map. The enhanced illumination component map, a specific illumination component map corresponding to a ground truth video frame and the specific illumination component map corresponding to the low-illuminance video frame are input into the sixth loss function to obtain a loss result. If the loss result is not within a function convergence range, network parameters of the initial convolutional neural network model are adjusted to obtain an adjusted convolutional neural network model. The input operation is repeated until the loss result of the sixth loss function falls into the function convergence range, determining that an obtained convolutional neural network model is the illumination map enhancement sub-model.

In an embodiment, the sixth loss function $loss_{ad}$ meets:

$$loss_{ad} =$$
$$\|L_{ad} - L_{low}\|_2^2 + \||\nabla|L_{ad}| - |\nabla L_{low}|\|_2^2 + \|L_{ad} - L_{GT}\|_2^2 + \||\nabla|L_{ad}| - |\nabla L_{GT}|\|_2^2$$

$L_{ad}$ represents the enhanced illumination component map. $L_{low}$ represents the illumination component map corresponding to the low-illuminance video frame. $L_{GT}$ represents the illumination component map corresponding to the ground truth video frame.

It should be noted that the reflectance map enhancement sub-model and the illumination map enhancement sub-model of the present embodiment may be trained simultaneously, thus reducing the time consumption of model training.

At S560, the enhanced reflectance component map and the enhanced illumination component map are multiplied to obtain enhanced frame images corresponding to the target video frame.

In an embodiment, the low-illuminance video processing device performs point multiplication on the enhanced reflectance component map and the enhanced illumination component map to determine enhanced frame images corresponding to the target video frame.

It should be noted that the low-illuminance video processing device may or may not execute the aforementioned step of S510. When the video processing device does not execute the aforementioned step of S510, it is not necessary to execute the aforementioned step of S530 correspondingly. At this point, the aforementioned step of S520 may be replaced by inputting the aligned target frame image set corresponding to the target video frame among all video frames into the decomposition sub-model to obtain a reflectance component map and an illumination component map corresponding to the target frame image set. The step of S540 may be replaced by inputting the reflectance component map into the reflectance map enhancement sub-model to obtain an enhanced reflectance component map. The step of S550 may be replaced by inputting the illumination component map into the illumination map enhancement sub-model to obtain an enhanced illumination component map.

The present embodiment fully considers that multiple consecutive video frames connected in a low-illuminance video have high correlation and similarity. Since the aligned frame image set including the highly correlated preceding frame images and subsequent frame images corresponding to the current video frame is used as an input of the low-illuminance image enhancement model, compared with a low-illuminance image enhancement model using a single frame of image as an input in the related technology, the low-illuminance image enhancement model can ensure that acquired video frame information is richer on the basis of ensuring the accuracy of the acquired video frame information because of the high correlation and similarity of the multiple input frame images, thus helping to increase the effect of the low-illuminance image enhancement model in enhancing video frames.

Figure 7:
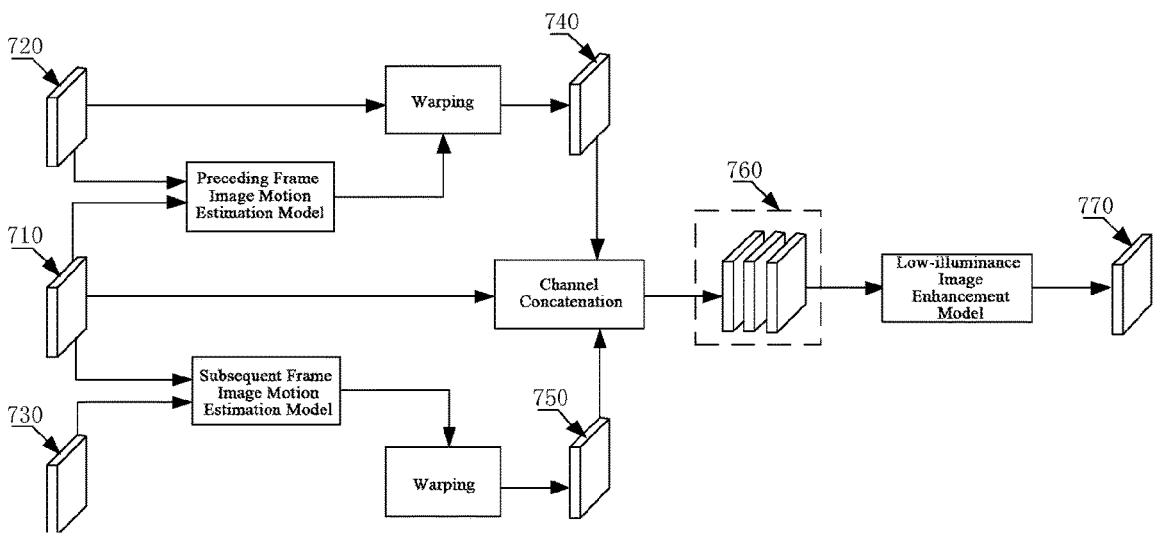
FIG. 7 is a schematic diagram of a flow of determining enhanced frame images according to an embodiment of the present disclosure.

For example, as shown in FIG. 7, taking n=1 (that is, a frame image set corresponding to a target video frame includes the target video frame 710l_lowt, a preceding frame image 720l_lowt−1, and a subsequent frame image 730l_lowt+1) and using the aforementioned second implementation to determine a motion vector corresponding to each supplementary frame image in the frame image set as an example, the step of S120 in the present embodiment is schematically illustrated. There are two motion estimation models, which are a preceding frame image motion estimation model ME_1 and a subsequent frame image motion estimation model ME_2 that are different.

The low-illuminance video processing device inputs the target video frame 710 and the preceding frame image 720 into the preceding frame image motion estimation model to obtain a motion vector MV1 corresponding to the preceding frame image. The low-illuminance video processing device inputs the target video frame 710 and the subsequent frame image 730 into the subsequent frame image motion estimation model to obtain a motion vector MV2 corresponding to the subsequent frame image. Based on the motion vector MV1, warping is performed on the preceding frame image 720 to determine a preceding frame image 740l_lowt' subjected to motion compensation which corresponds to the preceding frame image. Based on the motion vector MV2, warping is performed on the subsequent frame image 730 to determine a subsequent frame image 750 l_lowt'' subjected to motion compensation which corresponds to the subsequent frame image. The low-illuminance video processing device performs channel concatenation on the preceding frame image 740 subjected to motion compensation, the target video frame 710 and the subsequent frame image 750 subjected to motion compensation according to a red channel, a green channel and a blue channel to obtain an aligned frame image set 760I_low corresponding to the target video frame. The frame image set 760 is input into the low-illuminance image enhancement model to obtain enhanced frame images 770I_ENt corresponding to the target video frame.

At S130, an enhanced video is generated based on the enhanced frame images.

The low-illuminance video processing device generates the enhanced video according to the playing sequence correlation of each video frame based on the enhanced frame images corresponding to each video frame among all video frames.

To sum up, according to the low-illuminance video processing method provided by the present embodiment, the same number of preceding frame images and subsequent frame images corresponding to a current video frame of a low-illuminance video are acquired to obtain a frame image set corresponding to the current video frame, and traversal is performed on the low-illuminance video to obtain frame image sets corresponding to all video frames of the low-illuminance video. After image alignment is performed on the frame image sets corresponding to all video frames, the frame image sets are input into a pre-trained low-illuminance image on the enhanced frame images, realizing the enhancement of the quality of the low-illuminance video images, the improvement of brightness, color, contrast and details of the video, etc. Moreover, since the aligned frame image set including the multiple frame images is used as an input of the low-illuminance image enhancement model, compared with a low-illuminance image enhancement model using a single frame of image as an input in the related technology, the low-illuminance image enhancement model can increase the richness of acquired video frame information on the basis of ensuring the accuracy of the acquired video frame information because of the high correlation and similarity of the multiple input frame images, thus increasing the effect of the low-illuminance image enhancement model in enhancing video frames.

Figure 8:
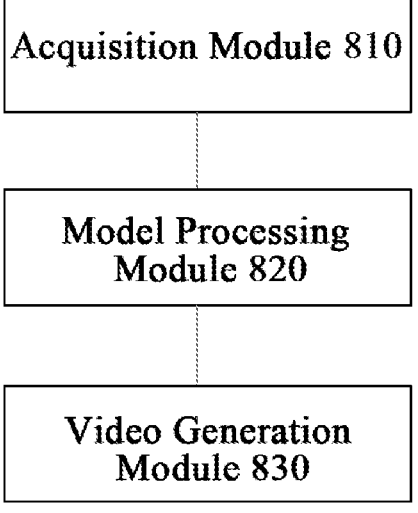
FIG. 8 is a schematic structural diagram of a low-illuminance video processing device according to an embodiment of the present disclosure.

FIG. 8 shows a schematic structural diagram of a low-illuminance video processing device according to an embodiment of the present disclosure. For the function of each module in the low-illuminance video processing device, refer to the steps of the method and the implementations of the steps in the present embodiment. The low-illuminance video processing device includes an acquisition model 810, a model processing module 820, and a video generation module 830.

The acquisition model 810 is configured for: acquiring a same number of preceding frame images and subsequent frame images corresponding to a current video frame of a low-illuminance video to obtain a frame image set corresponding to the current video frame; and performing traversal on the low-illuminance video to obtain frame image sets corresponding to all video frames.

The model processing module 820 is configured for: after performing image alignment on all frame images in the frame image sets corresponding to all video frames, inputting the frame image sets into a pre-trained low-illuminance image enhancement model to obtain enhanced frame images.

The video generation module 830 is configured for: generating an enhanced video based on the enhanced frame images.

In an embodiment, the model processing module 820 is further configured for: using a target video frame among all video frames as a reference frame image to perform motion estimation on each supplementary frame image in the frame image set corresponding to the target video frame, so as to sequentially determine a motion vector corresponding to each supplementary frame image in the frame image set corresponding to the target video frame, the supplementary frame images being the preceding frame images and the subsequent frame 30) images in the frame image set and the target video frame being each video frame among all video frames; respectively performing motion compensation on each supplementary frame image based on the motion vector corresponding to each supplementary frame image, so as to determine each supplementary frame image subjected to motion compensation; and concatenating the target video frame and each supplementary frame image subjected to motion compensation according to channels to obtain an aligned frame image set corresponding to the target video frame.

In an embodiment, the model processing module 820 is further configured for: for each supplementary frame image in the frame image set corresponding to the target video frame, inputting the target video frame and the supplementary frame image into a pre-trained motion estimation model to obtain a motion vector corresponding to the supplementary frame image.

In an embodiment, the model processing module 820 is further configured for: inputting the target video frame and a preceding frame image into a pre-trained preceding frame image motion estimation model to obtain a motion vector corresponding to the preceding frame image; and inputting the target video frame and a subsequent frame image into a pre-trained subsequent frame image motion estimation model to obtain a motion vector corresponding to the subsequent frame image.

In an embodiment, the model processing module 820 is further configured for: respectively performing warping on each supplementary frame image based on the motion vector corresponding to each supplementary frame image, so as to determine each supplementary frame image subjected to motion compensation.

In an embodiment, the low-illuminance image enhancement model includes: a decomposition sub-model, a reflectance map enhancement sub-model, and an illumination map enhancement sub-model. The model processing module 820 is further configured for: after performing image alignment on all frame images in a target frame image set corresponding to each target video frame among all video frames, inputting the target frame image set into the decomposition sub-model to obtain a reflectance component map and an illumination component map corresponding to the target frame image set, the target video frame being each video frame among all video frames; inputting the reflectance component map into the 30) reflectance map enhancement sub-model to obtain an enhanced reflectance component map; inputting the illumination component map into the illumination map enhancement sub-model to obtain an enhanced illumination component map; and multiplying the enhanced reflectance component map and the enhanced illumination component map to obtain enhanced frame images corresponding to the target video frame.

In an embodiment, the model processing module 820 is further configured for: adjusting an original resolution of each of the frame images subjected to image alignment in the target frame image set to a resolution threshold to obtain a resolution-adjusted target frame image set, the resolution threshold being less than the original resolution; inputting the resolution-adjusted target frame image set into the decomposition sub-model to obtain a reflectance component map and an illumination component map corresponding to the target frame image set; adjusting a resolution of the reflectance component map to the original resolution to obtain a reflectance component map with the original resolution; adjusting a resolution of the illumination component map to the original resolution to obtain an illumination component map with the original resolution; inputting the reflectance component map with the original resolution into the reflectance map enhancement sub-model to obtain an enhanced reflectance component map; and inputting the illumination component map with the original resolution into the illumination map enhancement sub-model to obtain an enhanced illumination component map.

In an embodiment, the acquisition module 810 is further configured for: acquiring one preceding frame image and one subsequent frame image corresponding to a current video frame of a low-illuminance video.

In an embodiment, the acquisition module 810 is further configured for: if the preceding frame images and the subsequent frame images corresponding to the current video frame are different in number, repeatedly copying the current video frame as a preceding frame image or a subsequent frame image until the numbers are equal.

To sum up, according to the low-illuminance video processing device provided by the present embodiment, the acquisition module acquires the same number of preceding frame images and subsequent frame images corresponding to a current video frame of a low-illuminance video to obtain a frame image set corresponding to the current video frame, and performs traversal on the low-illuminance video to obtain frame image sets corresponding to all video frames of the low-illuminance video. Thus, after performing image alignment on the frame image sets corresponding to all video frames, the model processing module inputs the frame image sets into a pre-trained low-illuminance image enhancement model to obtain enhanced frame images. The video generation module generates an enhanced video based on the enhanced frame images, realizing the enhancement of the quality of the low-illuminance video images, the improvement of brightness, color, contrast and details of the video, etc. Moreover, since the aligned frame image set including the multiple frame images is used as an input of the low-illuminance image enhancement model, compared with a low-illuminance image enhancement model using a single frame of image as an input in the related technology, the low-illuminance image enhancement model can increase the richness of acquired video frame information on the basis of ensuring the accuracy of the acquired video frame information because of the high correlation and similarity of the multiple input frame images, thus increasing the effect of the low-illuminance image enhancement model in enhancing video frames.

Figure 9:
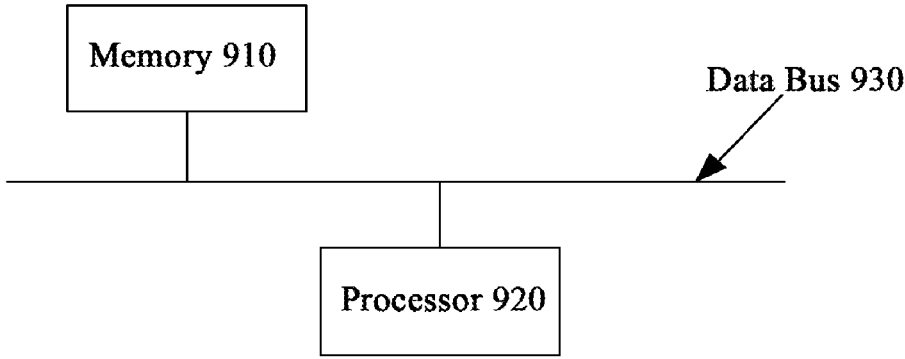
FIG. 9 is a schematic structural diagram of another low-illuminance video processing device according to an embodiment of the present disclosure.

FIG. 9 shows a schematic structural diagram of a low-illuminance video processing device according to the present embodiment. As shown in FIG. 9, the low-illuminance video processing device includes a memory 910, a processor 920, a program stored in the memory 910 and executable by the processor 920, and a data bus 930 configured for communicative connection between the processor 920 and the memory 910. The program, when executed by the processor 920, causes the processor 920 to implement steps S110 to S130 as shown in FIG. 1.

At S110, a same number of preceding frame images and subsequent frame images corresponding to a current video frame of a low-illuminance video are acquired to obtain a frame image set corresponding to the current video frame, and traversal is performed on the low-illuminance video to obtain frame image sets corresponding to all video frames.

At S120, after image alignment is performed on all frame images in the frame image sets corresponding to all video frames, the frame image sets are input into a pre-trained low-illuminance image enhancement model to obtain enhanced frame images.

At S130, an enhanced video is generated based on the enhanced frame images.

In an embodiment, the program, when executed by the processor 920, causes the processor to implement steps S210 to S230 as shown in FIG. 2.

At S210, a target video frame among all video frames is used as a reference frame image to perform motion estimation on each supplementary frame image in the frame image set corresponding to the target video frame, so as to sequentially determine a motion vector corresponding to each supplementary frame image in the frame image set corresponding to the target video frame. The supplementary frame images are preceding frame images and subsequent frame images in the frame image sets corresponding to the target video frames.

At S220, motion compensation is respectively performed on each supplementary frame image based on the motion vector corresponding to each supplementary frame image, so as to determine each supplementary frame image subjected to motion compensation.

At S230, the target video frame and each supplementary frame image subjected to motion compensation are concatenated according to channels to obtain an aligned frame image set corresponding to the target video frame.

In an embodiment, the program, when executed by the processor 920, causes the processor 920 to implement steps S510 to S560 as shown in FIG. 5.

At S510, a resolution of each of the frame images subjected to image alignment in the target frame image set corresponding to the target video frame among all video frames is adjusted from an original resolution to a resolution threshold to obtain a resolution-adjusted target frame image set. The resolution threshold is less than the original resolution.

At S520, the resolution-adjusted target frame image set is input into the decomposition sub-model of the low-illuminance image enhancement model to obtain a reflectance component map and an illumination component map corresponding to the target frame image set.

At S530, a resolution of the reflectance component map is adjusted to the original resolution to obtain a reflectance component map with the original resolution. A resolution of the illumination component map is adjusted to the original resolution to obtain an illumination component map with the original resolution.

At S540, the reflectance component map with the original resolution is input into the reflectance map enhancement sub-model to obtain an enhanced reflectance component map.

At S550, the illumination component map with the original resolution is input into the illumination map enhancement sub-model to obtain an enhanced illumination component map.

At S560, the enhanced reflectance component map and the enhanced illumination component map are multiplied to obtain enhanced frame images corresponding to the target video frame.

To sum up, according to the low-illuminance video processing device provided by the present embodiment, the same number of preceding frame images and subsequent frame images corresponding to a current video frame of a low-illuminance video are acquired to obtain a frame image set corresponding to the current video frame, and traversal is performed on the low-illuminance video to obtain frame image sets corresponding to all video frames of the low-illuminance video. After image alignment is performed on the frame image sets corresponding to all video frames, the frame image sets are input into a pre-trained low-illuminance image on the enhanced frame images, realizing the enhancement of the quality of the low-illuminance video images, the improvement of brightness, color, contrast and details of the video, etc. Moreover, since the aligned frame image set including the multiple frame images is used as an input of the low-illuminance image enhancement model, compared with a low-illuminance image enhancement model using a single frame of image as an input in the related technology, the low-illuminance image enhancement model can increase the richness of acquired video frame information on the basis of ensuring the accuracy of the acquired video frame information because of the high correlation and similarity of the multiple input frame images, thus increasing the effect of the low-illuminance image enhancement model in enhancing video frames.

An embodiment of the present disclosure further provides a storage medium, which stores one or more programs. The one or more programs may be executed by one or more processors to implement the following steps as shown in FIG. 1.

At S110, a same number of preceding frame images and subsequent frame images corresponding to a current video frame of a low-illuminance video are acquired to obtain a frame image set corresponding to the current video frame, and traversal is performed on the low-illuminance video to obtain frame image sets corresponding to all video frames.

At S120, after image alignment is performed on all frame images in the frame image sets corresponding to all video frames, the frame image sets are input into a pre-trained low-illuminance image enhancement model to obtain enhanced frame images.

At S130, an enhanced video is generated based on the enhanced frame images.

In an embodiment, the one or more programs may be executed by one or more processors to implement the following steps as shown in FIG. 2:

At S210, a target video frame among all video frames is used as a reference frame image to perform motion estimation on each supplementary frame image in the frame image set corresponding to the target video frame, so as to sequentially determine a motion vector corresponding to each supplementary frame image in the frame image set corresponding to the target video frame. The supplementary frame images are preceding frame images and subsequent frame images in the frame image sets corresponding to the target video frames.

At S220, motion compensation is respectively performed on each supplementary frame image based on the motion vector corresponding to each supplementary frame image, so as to determine each supplementary frame image subjected to motion compensation.

At S230, the target video frame and each supplementary frame image subjected to motion compensation are concatenated according to channels to obtain an aligned frame image set corresponding to the target video frame.

In an embodiment, the one or more programs may be executed by one or more processors to implement the following steps as shown in FIG. 5:

At S510, a resolution of each of the frame images subjected to image alignment in the target frame image set corresponding to the target video frame among all video frames is adjusted from an original resolution to a resolution threshold to obtain a resolution-adjusted target frame image set. The resolution threshold is less than the original resolution.

At S520, the resolution-adjusted target frame image set is input into the decomposition sub-model of the low-illuminance image enhancement model to obtain a reflectance component map and an illumination component map corresponding to the target frame image set.

At S530, a resolution of the reflectance component map is adjusted to the original resolution to obtain a reflectance component map with the original resolution. A resolution of the illumination component map is adjusted to the original resolution to obtain an illumination component map with the original resolution.

At S540, the reflectance component map with the original resolution is input into the reflectance map enhancement sub-model to obtain an enhanced reflectance component map.

At S550, the illumination component map with the original resolution is input into the illumination map enhancement sub-model to obtain an enhanced illumination component map.

At S560, the enhanced reflectance component map and the enhanced illumination component map are multiplied to obtain enhanced frame images corresponding to the target video frame.

According to the low-illuminance video processing method, the low-illuminance video processing device and the storage medium provided by the embodiments of the present disclosure, the acquisition module acquires the same number of preceding frame images and subsequent frame images corresponding to a current video frame of a low-illuminance video to obtain a frame image set corresponding to the current video frame, and performs traversal on the low-illuminance video to obtain frame image sets corresponding to all video frames of the low-illuminance video. Thus, after performing image alignment on the frame image sets corresponding to all video frames, the model processing module inputs the frame image sets into a pre-trained low-illuminance image enhancement model to obtain enhanced frame images.

The video generation module generates an enhanced video based on the enhanced frame images, realizing the enhancement of the quality of the low-illuminance video images, the improvement of brightness, color, contrast and details of the video, etc. Moreover, since the aligned frame image set including the multiple frame images is used as an input of the low-illuminance image enhancement model, compared with a low-illuminance image enhancement model using a single frame of image as an input in the related technology, the low-illuminance image enhancement model can increase the richness of acquired video frame information on the basis of ensuring the accuracy of the acquired video frame information because of the high correlation and similarity of the multiple input frame images, thus increasing the effect of the low-illuminance image enhancement model in enhancing video frames.

It can be understood by those having ordinary skill in the art that all or some of the steps in the methods and the functional modules/units in the system and device disclosed above may be implemented as software, firmware, hardware and their appropriate combinations.

In a hardware implementation, the division of the functional modules/units mentioned in the above description does not necessarily correspond to the division of physical components. For example, a physical component may have multiple functions, or a function or step may be executed by a plurality of physical components in cooperation. Some or all of the physical components may be implemented as software executed by a processor (such as a central processing unit, a digital signal processor or a microprocessor), hardware or an integrated circuit (such as an application-specific integrated circuit). Such software may be distributed on computer-readable media, which may include computer storage media (or non-transitory media) and communication media (or transitory media). As well-known to those of ordinary skill in the art, the term "computer storage media" include volatile and nonvolatile, removable and non-removable media implemented in any method or technology for storing information (such as computer-readable instructions, data structures, program modules or other data). Computer storage media include but are not limited to RAM, ROM, EEPROM, flash memory or other memory technologies, CD-ROM, digital versatile disk (DVD) or other optical disk storage, magnetic cassettes, magnetic tapes, magnetic disk storage or other magnetic storage devices or any other media that can be used to store desired information and can be accessed by computers. Furthermore, it is well-known to those of ordinary skill in the art that communication media typically contain computer-readable instructions, data structures, program modules or other data in a modulated data signal such as carriers or other transmission mechanisms, and can include any information delivery media.

The preferred embodiments of the present disclosure have been described above with reference to the accompanying drawings, and are not intended to limit the scope of the claims of the present disclosure. Any modification, equivalent substitution and improvement which are made by those having ordinary skill in the art without departing from the scope and essence of the present disclosure shall fall within the scope of the claims of the present disclosure.

The invention claimed is:

1. A low-illuminance video processing method, comprising:

acquiring a same number of preceding frame images and subsequent frame images corresponding to a current video frame of a low-illuminance video to obtain a frame image set corresponding to the current video frame, and performing traversal on the low-illuminance video to obtain frame image sets corresponding to all video frames;

after performing image alignment on all frame images in the frame image sets corresponding to all video frames, inputting the frame image sets into a pre-trained low-illuminance image enhancement model to obtain enhanced frame images; and generating an enhanced video based on the enhanced frame images;

wherein the performing image alignment on all frame images in the frame image sets corresponding to all video frames comprises:

using a target video frame among all video frames as a reference frame image to perform motion estimation on each of supplementary frame images in the frame image set corresponding to the target video frame, so as to sequentially determine a motion vector corresponding to the each of the supplementary frame images in the frame image set corresponding to the target video frame, the supplementary frame images being the preceding frame images and the subsequent frame images in the frame image set and the target video frame being each video frame among all video frames;

respectively performing motion compensation on each of the supplementary frame images based on the motion vector corresponding to each of the supplementary frame images; and concatenating the target video frame and each of the supplementary frame images subjected to motion compensation according to channels to obtain an aligned frame image set corresponding to the target video frame;

wherein using the target video frame among all video frames as the reference frame image to perform motion estimation on each supplementary frame image in the frame image set corresponding to the target video frame, so as to sequentially determine the motion vector corresponding to each supplementary frame image in the frame image set corresponding to the target video frame comprises:

inputting the target video frame and the preceding frame image into a pre-trained preceding frame image motion estimation model to obtain a motion vector corresponding to the preceding frame image; and inputting the target video frame and the subsequent frame image into a pre-trained subsequent frame image motion estimation model to obtain a motion vector corresponding to the subsequent frame image.

2. The method of claim 1, wherein the low-illuminance image enhancement model comprises:

a decomposition sub-model, a reflectance map enhancement sub-model, and an illumination map enhancement sub-model; and after performing image alignment on all frame images in the frame image sets corresponding to all video frames, inputting the frame image sets into the pre-trained low-illuminance image enhancement model to obtain the enhanced frame images comprises:

after performing image alignment on all frame images in a target frame image set corresponding to the target video frame among all video frames, inputting the target frame image set into the decomposition sub-model to obtain a reflectance component map and an illumination component map corresponding to the target frame image set, the target video frame being each video frame among all video frames;

inputting the reflectance component map into the reflectance map enhancement sub-model to obtain an enhanced reflectance component map;

inputting the illumination component map into the illumination map enhancement sub-model to obtain an enhanced illumination component map; and multiplying the enhanced reflectance component map and the enhanced illumination component map to obtain enhanced frame images corresponding to the target video frame.

3. The method of claim 2, wherein before inputting the target frame image set into the decomposition sub-model to obtain the reflectance component map and the illumination component map corresponding to the target frame image set, the method further comprises:

adjusting a resolution of each of the frame images subjected to image alignment in the target frame image set from an original resolution to a resolution threshold to obtain a resolution-adjusted target frame image set, the resolution threshold being less than the original resolution;

wherein inputting the target frame image set into the decomposition sub-model to obtain the reflectance component map and the illumination component map corresponding to the target frame image set comprises:

inputting the resolution-adjusted target frame image set into the decomposition sub-model to obtain the reflectance component map and the illumination component map corresponding to the target frame image set;

wherein after inputting the target frame image set into the decomposition sub-model to obtain the reflectance component map and the illumination component map corresponding to the target frame image set, the method further comprises:

adjusting a resolution of the reflectance component map to the original resolution to obtain the reflectance component map with the original resolution; and adjusting a resolution of the illumination component map to the original resolution to obtain the illumination component map with the original resolution;

wherein inputting the reflectance component map into the reflectance map enhancement sub-model to obtain the enhanced reflectance component map comprises:

inputting the reflectance component map with the original resolution into the reflectance map enhancement sub-model to obtain the enhanced reflectance component map; and wherein inputting the illumination component map into the illumination map enhancement sub-model to obtain the enhanced illumination component map comprises:

inputting the illumination component map with the original resolution into the illumination map enhancement sub-model to obtain the enhanced illumination component map.

4. The method of claim 1, wherein acquiring the same number of preceding frame images and the subsequent frame images corresponding to the current video frame of the low-illuminance video comprises:

acquiring one preceding frame image and one subsequent frame image corresponding to a current video frame of a low-illuminance video.

5. The method of claim 4, wherein when the current video frame is a first frame in a motion scene to which the current video frame belongs, a frame image of the current video frame is used as the preceding frame image corresponding to the current video frame;

when the current video frame is a last frame in the motion scene to which the current video frame belongs, the frame image of the current video frame is used as the subsequent frame image corresponding to the current video frame.

6. The method of claim 1, further comprising:

when the preceding frame images and the subsequent frame images corresponding to the current video frame are different in number, repeatedly copying the current video frame as a preceding frame image or a subsequent frame image until a number of the preceding frame images is equal to a number of the subsequent frame images.

7. The method of claim 1, wherein the respectively performing motion compensation on each of the supplementary frame images based on the motion vector corresponding to each of the supplementary frame images comprises:

based on the motion vector corresponding to each supplementary frame image, respectively performing warping on each of the supplementary frame images.

8. A low-illuminance video processing device, comprising:

a memory; a processor; a program stored in the memory and executable by the processor; and a data bus, configured for communicative connection between the processor and the memory, wherein the program, when executed by the processor, causes the processor to carry out a low-illuminance video processing method comprising:

acquiring a same number of preceding frame images and subsequent frame images corresponding to a current video frame of a low-illuminance video to obtain a frame image set corresponding to the current video frame, and performing traversal on the low-illuminance video to obtain frame image sets corresponding to all video frames;

after performing image alignment on all frame images in the frame image sets corresponding to all video frames, inputting the frame image sets into a pre-trained low-illuminance image enhancement model to obtain enhanced frame images; and generating an enhanced video based on the enhanced frame images;

wherein the performing image alignment on all frame images in the frame image sets corresponding to all video frames comprises:

using a target video frame among all video frames as a reference frame image to perform motion estimation on each of supplementary frame images in the frame image set corresponding to the target video frame, so as to sequentially determine a motion vector corresponding to the each of the supplementary frame images in the frame image set corresponding to the target video frame, the supplementary frame images being the preceding frame images and the subsequent frame images in the frame image set and the target video frame being each video frame among all video frames;

respectively performing motion compensation on each of the supplementary frame images based on the motion vector corresponding to each of the supplementary frame images; and concatenating the target video frame and each of the supplementary frame images subjected to motion compensation according to channels to obtain an aligned frame image set corresponding to the target video frame;

wherein using the target video frame among all video frames as the reference frame image to perform motion estimation on each supplementary frame image in the frame image set corresponding to the target video frame, so as to sequentially determine the motion vector corresponding to each supplementary frame image in the frame image set corresponding to the target video frame comprises:

inputting the target video frame and the preceding frame image into a pre-trained preceding frame image motion estimation model to obtain a motion vector corresponding to the preceding frame image; and inputting the target video frame and the subsequent frame image into a pre-trained subsequent frame image motion estimation model to obtain a motion vector corresponding to the subsequent frame image.

9. A non-transitory computer-readable storage medium storing one or more programs which, when executed by one or more processors, cause the one or more processors to carry out a low-illuminance video processing method comprising:

acquiring a same number of preceding frame images and subsequent frame images corresponding to a current video frame of a low-illuminance video to obtain a frame image set corresponding to the current video frame, and performing traversal on the low-illuminance video to obtain frame image sets corresponding to all video frames;

after performing image alignment on all frame images in the frame image sets corresponding to all video frames, inputting the frame image sets into a pre-trained low-illuminance image enhancement model to obtain enhanced frame images; and generating an enhanced video based on the enhanced frame images;

wherein the performing image alignment on all frame images in the frame image sets corresponding to all video frames comprises:

using a target video frame among all video frames as a reference frame image to perform motion estimation on each of supplementary frame images in the frame image set corresponding to the target video frame, so as to sequentially determine a motion vector corresponding to each of the supplementary frame images in the frame image set corresponding to the target video frame, the supplementary frame images being the preceding frame images and the subsequent frame images in the frame image set and the target video frame being each video frame among all video frames;

respectively performing motion compensation on each of the supplementary frame images based on the motion vector corresponding to each of the supplementary frame images; and concatenating the target video frame and each of the supplementary frame images subjected to motion compensation according to channels to obtain an aligned frame image set corresponding to the target video frame;

wherein using the target video frame among all video frames as the reference frame image to perform motion estimation on each supplementary frame image in the frame image set corresponding to the target video frame, so as to sequentially determine the motion vector corresponding to each supplementary frame image in the frame image set corresponding to the target video frame comprises:

inputting the target video frame and the preceding frame image into a pre-trained preceding frame image motion estimation model to obtain a motion vector corresponding to the preceding frame image; and inputting the target video frame and the subsequent frame image into a pre-trained subsequent frame image motion estimation model to obtain a motion vector corresponding to the subsequent frame image.

10. The non-transitory computer-readable storage medium of claim 9, wherein the low-illuminance image enhancement model comprises:

a decomposition sub-model, a reflectance map enhancement sub-model, and an illumination map enhancement sub-model; and after performing image alignment on all frame images in the frame image sets corresponding to all video frames, inputting the frame image sets into the pre-trained low-illuminance image enhancement model to obtain the enhanced frame images comprises:

after performing image alignment on all frame images in a target frame image set corresponding to the target video frame among all video frames, inputting the target frame image set into the decomposition sub-model to obtain a reflectance component map and an illumination component map corresponding to the target frame image set, the target video frame being each video frame among all video frames;

inputting the reflectance component map into the reflectance map enhancement sub-model to obtain an enhanced reflectance component map;

inputting the illumination component map into the illumination map enhancement sub-model to obtain an enhanced illumination component map; and multiplying the enhanced reflectance component map and the enhanced illumination component map to obtain enhanced frame images corresponding to the target video frame.

11. The non-transitory computer-readable storage medium of claim 10, wherein before inputting the target frame image set into the decomposition sub-model to obtain the reflectance component map and the illumination component map corresponding to the target frame image set, the method further comprises:

adjusting a resolution of each of the frame images subjected to image alignment in the target frame image set from an original resolution to a resolution threshold to obtain a resolution-adjusted target frame image set, the resolution threshold being less than the original resolution;

wherein inputting the target frame image set into the decomposition sub-model to obtain the reflectance component map and the illumination component map corresponding to the target frame image set comprises:

inputting the resolution-adjusted target frame image set into the decomposition sub-model to obtain the reflectance component map and the illumination component map corresponding to the target frame image set;

wherein after inputting the target frame image set into the decomposition sub-model to obtain the reflectance component map and the illumination component map corresponding to the target frame image set, the method further comprises:

adjusting a resolution of the reflectance component map to the original resolution to obtain the reflectance component map with the original resolution; and adjusting a resolution of the illumination component map to the original resolution to obtain the illumination component map with the original resolution;

wherein inputting the reflectance component map into the reflectance map enhancement sub-model to obtain the enhanced reflectance component map comprises:

inputting the reflectance component map with the original resolution into the reflectance map enhancement sub-model to obtain the enhanced reflectance component map; and wherein inputting the illumination component map into the illumination map enhancement sub-model to obtain the enhanced illumination component map comprises:

inputting the illumination component map with the original resolution into the illumination map enhancement sub-model to obtain the enhanced illumination component map.

12. The non-transitory computer-readable storage medium of claim 9, wherein acquiring the same number of preceding frame images and the subsequent frame images corresponding to the current video frame of the low-illuminance video comprises:

acquiring one preceding frame image and one subsequent frame image corresponding to a current video frame of a low-illuminance video.

13. The non-transitory computer-readable storage medium of claim 12, wherein when the current video frame is a first frame in a motion scene to which the current video frame belongs, a frame image of the current video frame is used as the preceding frame image corresponding to the current video frame;

when the current video frame is a last frame in the motion scene to which the current video frame belongs, the frame image of the current video frame is used as the subsequent frame image corresponding to the current video frame.

14. The non-transitory computer-readable storage medium of claim 9, wherein the respectively performing motion compensation on each of the supplementary frame images based on the motion vector corresponding to each of the supplementary frame images comprises:

based on the motion vector corresponding to each supplementary frame image, respectively performing warping on each of the supplementary frame images.

* * * * *